(12) United States Patent
Herrick et al.

(10) Patent No.: US 8,113,386 B2
(45) Date of Patent: Feb. 14, 2012

(54) DEVICE AND METHOD FOR ON-DEMAND DISPENSING OF SPOONABLE OR DRINKABLE FOOD PRODUCTS HAVING VISUAL APPEARANCE OF MULTI-COMPONENTS

(75) Inventors: James Peter Herrick, Brookville, CT (US); William Overbaugh, Lakeside, CT (US); Richard J. Farrell, New Milford, CT (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 12/844,485

(22) Filed: Jul. 27, 2010

(65) Prior Publication Data

US 2010/0288798 A1    Nov. 18, 2010

Related U.S. Application Data

(60) Continuation of application No. 12/480,252, filed on Jun. 8, 2009, now Pat. No. 7,798,182, which is a division of application No. 10/978,315, filed on Oct. 28, 2004, now Pat. No. 7,559,346, which is a division of application No. 09/935,064, filed on Aug. 21, 2001, now abandoned.

(51) Int. Cl.
B67D 7/70    (2010.01)

(52) U.S. Cl. ............... 222/139; 222/132; 141/105

(58) Field of Classification Search ............ 141/9, 67, 141/100, 102, 105, 234, 236; 426/249, 565; 222/132, 139
See application file for complete search history.

(56) References Cited

U.S. PATENT DOCUMENTS

| | | | |
|---|---|---|---|
| 2,919,836 A | | 1/1960 | Limpert |
| 3,267,971 A | | 8/1966 | Mueller |
| 3,347,287 A | | 10/1967 | Gerber |
| 3,427,999 A | | 2/1969 | Schultz |
| 3,460,717 A | * | 8/1969 | Thomas ............... 222/129.1 |
| 3,559,700 A | | 2/1971 | Erickson |
| 3,803,870 A | | 4/1974 | Conz |
| 3,886,973 A | | 6/1975 | Kinney |
| 4,015,644 A | | 4/1977 | Kinney |
| 4,184,613 A | | 1/1980 | Kinney |
| 4,504,511 A | | 3/1985 | Binley |
| 4,645,093 A | | 2/1987 | Jones |
| 4,942,910 A | | 7/1990 | Hamanura |
| 5,713,209 A | | 2/1998 | Hunchar et al. |
| 5,799,832 A | | 9/1998 | Mayo |
| 5,823,392 A | | 10/1998 | Mandico |
| 5,888,567 A | * | 3/1999 | Daouse ............... 426/249 |
| 5,950,448 A | | 9/1999 | Barnes et al. |
| 5,962,035 A | * | 10/1999 | Masse et al. ........... 425/131.1 |
| 5,996,652 A | | 12/1999 | Schromm |
| 6,003,733 A | | 12/1999 | Wheeler |

(Continued)

FOREIGN PATENT DOCUMENTS

EP    1040759    10/2000

(Continued)

*Primary Examiner* — Timothy L Maust
(74) *Attorney, Agent, or Firm* — K&L Gates LLP

(57) ABSTRACT

A dispensing system and method for the on-demand dispensing of spoonable or drinkable food products into a container. Single servings or larger portions of these products can be dispensed. The system and method achieve dispensing of the product with a visual differentiation of the components in the container. The container may be translucent or transparent so that the consumer can view the visually differentiated product therein. The products form yet another embodiment of the invention.

8 Claims, 12 Drawing Sheets

U.S. PATENT DOCUMENTS

| | | |
|---|---|---|
| 6,223,949 B1 * | 5/2001 | Spencer et al. ............... 222/140 |
| 6,235,320 B1 | 5/2001 | Daravingas et al. |
| 6,367,519 B2 | 4/2002 | Thibiant et al. |
| 7,559,346 B2 | 7/2009 | Herrick et al. |

FOREIGN PATENT DOCUMENTS

| | | |
|---|---|---|
| EP | 0701777 | 10/2009 |

* cited by examiner

DEVICE AND METHOD FOR ON-DEMAND DISPENSING OF SPOONABLE OR DRINKABLE FOOD PRODUCTS HAVING VISUAL APPEARANCE OF MULTI-COMPONENTS

CROSS REFERENCE TO RELATED APPLICATIONS

This application is a continuation of U.S. application Ser. No. 12/480,252, filed Jun. 8, 2009, which is a divisional of U.S. application Ser. No. 10/978,315, filed Oct. 28, 2004, now U.S. Pat. No. 7,559,346, which is a divisional of U.S. application Ser. No. 09/935,064, filed Aug. 21, 2001, now abandoned, the contents of which are expressly incorporated herein by reference thereto.

FIELD OF THE INVENTION

The present invention generally relates to the on-demand dispensing of spoonable or drinkable products of unique attractive appearance. More particularly, the invention relates to a dispensing device and method that allows to serve on demand, and in an automated manner, combinations of food components having a pleasing distinctive appearance in the cup. More preferably, the invention relates to the dispensing of refrigerated food product such as acidified dairy products and the like in a customized way of attractive appearance.

BACKGROUND OF THE INVENTION

It becomes an increasingly important trend now to eat away from home. The growth of the foodservice area is fueled by a number of factors including the fact that the industrialized nations are getting older, richer and have more women working and ethnic community increasingly prepared to eat away from home. The younger generation of ages between 15 to 30 also spends a large amount of their available cash on food away from home. This group learns early not to cook but to eat out. As a result, a large community is at the mercy of the standardized and poorly nutritional offer of food in some food service areas. This community is also very sensible to the nutritional deficiencies. Very little choice of nutritional, fresh and appealing food is generally proposed that provides beneficial and attractive effects such as in fastfoods, catering, restaurants, canteens or other foodservice facilities.

Refrigerated acidified dairy products such as yogurts are well known but their consumption out of home is underestimated partly because the offer is poor in quality and/or unattractive. Their beneficial effect on the intestinal tract and flora has been recognized since a long time. As a result, yogurt has great potential as of a protective, anti-infection agent. They also benefit of a good image reflecting strong values such a healthy and responsible lifestyle.

Increased yogurt consumption might help increase one's resistance to immune-related diseases such infection, particularly gastrointestinal infection. This is in part due to the live and active cultures found in acidified dairy products. Acidified dairy products continues to be an excellent source of calcium and a good source of protein. The claim most substantiated is yogurt's beneficial effect on digestion in some individuals. People who are lactose intolerant have a hard time digesting milk products because they lack the enzyme that breaks down the main carbohydrate in milk. Yogurt or other acidified dairy products is a unique food because the starter cultures actually produce that enzyme during fermentation. Thus, the milk sugar in yogurt is more easily digested, even for lactose-intolerant individuals. Many people who commonly experience gas, bloating or discomfort from dairy foods can digest yogurt more easily, thanks to the starter cultures. This is especially true if the yogurt contains live cultures.

The usefulness of probiotics in reducing the risk of intestinal infections has also been evidenced. Studies have shown, for example, that children suffering from chronic diarrhea recover faster when fed yogurt with probiotic cultures. Adults suffering from traveler's diarrhea also seem to benefit.

As women tend to reduce their milk consumption as they get older-which may lead to osteoporosis-and children consume more soft drinks than milk, acidified product such as yogurt provides a great-tasting way to get the calcium and protein needed to maintain good health. Therefore, the consumption of acidified dairy product is recommended on a daily basis by persons of all age and particularly, children, active persons and elderly people.

Spoonable acidified dairy products are normally provided to the consumer in a plastic or waxboard type cup with a lid. Such products commonly come in a form having fruit sauce at the bottom and plain yogurt above this fruit layer. They can be commonly found in grocery stores or shelves of self-service cafeterias.

Alternatively, hand-made or industrially prepared dairy products exist such as "Parfait"-type layered products that are pre-assembled for later sale. Those products comprise superimposed layers of fruit sauce and yogurt that are either made by hand in a remote corner of the restaurant or are manufactured in an industrial setting and frozen for transport and preservation.

The hand-made products suffer from several drawbacks. Firstly, the preparation is not time and labor efficient. Secondly, the results may also vary from one operator to another and repeatability of just the desired products cannot be ensured overtime or from place to place. Therefore, the consumer may be once deceived from the product and decide not to buy the product anymore. Thirdly, customization to the complexity of the consumer's demand is difficult which therefore limits the choice for several attractive designs which would render the offer even more appealing and/or would touch a larger public.

The industrially prepared dairy products suffer from further drawbacks. The product is produced in the factory from refrigerated components which are deposited in the cup according to a predetermined design. The packaged products in general are cooled to refrigerated temperatures and maintained refrigerated through consumption. Such commercially refrigerated products suffer from several drawbacks. The quality of the product tends to degrade over time and special formulations are required and/or additives such as stabilizers must be added to the product to prevent bleeding or syneresis of the certain components of the product. The flexibility in providing various product designs, flavors and textures is limited due to the resources in manufacturing labor and production lines. The costs in packaging, storage and transport of such portioned products is relatively high.

The industrially prepared low acid dairy products might also be frozen to retain their attractive design of separated layers. Normally, the product is sensitive to thawing and its stability degrades after a few minutes after being thawed. In order to reduce after-thawing stability problems, little free water is kept in the frozen product and large amounts of stabilizers are included. Stabilizers usually affect the natural taste and viscosity of the product and the consumer is very keen in noticing these changes. The foodservice operator must remove the product from the freezer several hours before serving and keep the product in a refrigerator to avoid temperature abuse of the product which would raise the acidity level and possibly provide contamination. Therefore, storage floor is consumed in the foodservice place. Anticipation of the consumer's demand is also required which can be a problem as re-freezing of the product after thawing is absolutely forbidden for sanitary reasons.

Another problem may also occur that affects the quality of the product itself due to the thawing of the product. Indeed, as the product in the cup exhibits different phases such as dairy phase and the fruit sauce or syrup phase, the relatively long period for fully decreasing the temperature until chilled temperature of consumption is reached, effects the contrast and external aspect of freshness of the product. Usually, the product experiences a "bleeding" effect of the more liquid phase; e.g., the syrup or sauce, into the dairy phase. As a result, the product attractiveness and the fresh looking aspect and perceived quality are adversely affected.

Prior art devices and processes do not remedy these problems.

U.S. Pat. No. 5,779,832 relates to a complicated frozen dessert and drink dispenser for simultaneous or alternate dispensing of two products. The dispenser has an automated cleaning system for cleaning the pieces in contact with the frozen food product.

U.S. Pat. No. 5,823,392 relates to a yogurt/cereal grain mixture dispensing machine using manual gravity for dispensing the product.

U.S. Pat. No. 5,950,448 relates to a system and method for dispensing and combining refrigerated source liquids such as juices, yogurt, etc., which serve as base level ingredients in the preparation of pulverized, slush-like consistency consumer beverages. The system contemplates that addition of flavoring additives to the refrigerated component by ladling or scooping directly into a blending receptacle of a finishing station. Such system and method remain labor consuming and lacks convenience for the operator. Furthermore, the appearance of the resulting product that is served to the consumer is limited due to the manual blending and will greatly depend on the personal ability of the operator to make it attractive and original.

Therefore, there is a need for providing control over the preparation and serving of multi-components refrigerated products for improving appearance and meeting consumer's demand and acceptance.

There is also a need for providing on demand in a cost, labor efficient and rapid way, a product having an improved appealing appearance over the existing refrigerated products.

There is also a need for increasing the overall attractiveness of refrigerated healthy desserts in the foodservice area by proposing an offer that is capable of more closely matching the demand of the consumers for fresh, good looking, good tasting, nutritious and healthy products.

There is also a need for providing the aforementioned advantages while delivering a product on demand without preparation and significant waiting time.

There is also a need for more flexibility in the delivery of attractive healthy and good looking products to the consumer with a liberty to customize products upon request.

There is also a need for achieving the on-demand production of multi-components products of fresh, stable and attractive appearance with no apparent "bleeding" effect.

There is also a need for providing multi-component products having phase stability upon serving to the consumer without requiring the use of important amounts of stabilizers.

There is also a need for achieving distinctive but reproductive product designs that may confer a signature for a brand, a store or a restaurant's network.

There is also a need for providing relatively sophisticated products dispensed in a system of relatively small foot print and possibly, a range of products of different appearance and/or nature; i.e., made from a variety of food components, while not affecting the space efficiency and equipment cost.

There is also a need for dispensing air sensitive products, such as refrigerated acidified dairy products and the like, while avoiding direct contact with permanent pieces of the dispensing systems that would require complicated and time consuming cleaning operations.

The present invention now satisfies these needs.

SUMMARY OF THE INVENTION

The invention relates to a dispensing system, preferably, for on-demand dispensing of at least a single serve spoonable or drinkable food product in a container comprising storage members for separately storing a plurality of food components having different specific characteristics. The system comprises pump means adapted for transporting the food components from the storage members to a point of dispensing. Preferably, each component is individually transported by independent pump means. The system further comprises selection means for selecting a portion of food product and control means adapted to control the actuation of at least two of the pump means as a response to the activation of the selection means during the dispensing and serving of a portion of the food product. The system achieves via the control means the dispensing of the product with a visual differentiation of the components in the container.

The term "portion of food product" as used herein usually refers to a serving of one portioned cup of product. The cup may be a single serving for an individual or a larger portion for serving a group of individuals.

In a general aspect of the invention, the visual differentiation is obtained by controlling the pump means during dispensing of the portion of the product according to at least one variable selected from the group consisting of pump velocity, pumping time, discharge cycling mode, discharge arrangement and combinations thereof.

The term "pump velocity" as used herein refers to the ability of the pump means to discharge a flow of food component according to a determined flow rate.

The term "pumping time" as used herein refers to the time the discharge flow rate of a component is maintained for one portion of product.

The term "discharge cycling mode" as used herein refers to the manner the discharge flows for the food components are sequenced in the preparation of a portion of the product.

The term "discharge arrangement" as used herein refers to the manner the flows of food components are discharged from the outlet(s) of the device in the cup.

In a first preferred embodiment, the control means are adapted to selectively actuate the pump means in a sequential cycling discharge mode during the dispense of a portion of product. As a result of this sequential discharge cycling mode, a visual differentiation can be achieved under the form of a plurality of superimposed layers. The layers form stacks of layers having specific characteristics that differ from one layer to another adjacent layer.

In a second possible embodiment, the control means are adapted to selectively actuate the pump means in a simultaneous discharge mode for the dispense of a portion of product.

As a result, a visual differentiation can be obtained in the form of a swirled effect.

In a preferred aspect of the invention, the pump means transports the food components without directly contacting them. As a result, cross contamination of the food components that could alter the desired product pattern in the cup is minimized. Furthermore, the device requires little maintenance and cleaning. In an even more preferred aspect of the invention, each pump means transports the food components by forcing transport of each food component through a disposable hose attached to the storage member. As a result, it is possible to discharge the food components separately in a clean and hygienic manner without contact with the various pieces of the dispensing device.

Preferably, each pump means forces the food components to a merging means in which the food components are substantially merged without thorough mixing. Therefore, it is possible to properly direct the food components in the container in a convenient and rapid way while achieving through different discharge cycling modes a wide range of attractive patterns. In a preferred embodiment, the merging means is a common nozzle member that has separate inlets to receive the flow of each food component and adjacent outlets in which the flows of food components are substantially merged in the direction of the point of dispensing. Thus, through this nozzle arrangement, the merging means can properly discharge the food components according to any desired discharge arrangements while further substantially maintaining the discharge means of restricted section in the required temperature conditions to permanently ensure good flowing properties and hygienic conditions of the food.

In an even more preferred aspect, the adjacent outlets comprise a plurality of concentrically arranged dispensing channels for separately dispensing the food components. We have found that a discharge arrangement with concentrically arranged discharging zones improves the product distribution in the product container when discharging multi-components. In particular, the food components located in the periphery have a tendency to distribute along the sidewalls of the container thereby becoming more visible for lower amounts of product dispensed. Furthermore, the food component discharged more centrally helps to further distribute the discharged amount of the peripheral food component more efficiently along the sidewalls by exerting a radial pressure on it. The distribution may also be fine tuned by varying the pump velocity of each component depending on the food characteristics and the pattern desired in the container.

In an alternative, the discharging outlets may be arranged by two pairs of diagonally opposed outlets that are capable of creating diagonally opposed quadrants of distinct components in the container.

In another alternative, the discharging outlets may be separated by a spirally shaped distribution member that is capable of creating hemispheres of distinct components in the container.

The invention also relates to a method for delivering at least a single serve portion of spoonable or drinkable food product of fresh appearance on demand in a container comprising pumping at least two food components of different specific characteristics from at least two separate storage sources while effecting a visual differentiation of the two components in the container.

In a preferred aspect of the method, the food components are pumped either sequentially or simultaneously. The method preferably comprises pumping a portion of the food product according to repeated sequential cycles of the at least two components in an alternative manner until to obtain a layered visual configuration in the container. Even more preferably, a pause is respected between each dispensing cycles that is sufficient to allow each layer to settle in the container.

In an alternative, the method comprises pumping a portion of the food product according to a simultaneous pumping of the two components. Preferably, a differential of the pumping rates between the two pumped components is created that is capable of providing a swirled visual differentiation of the two components in the container.

The method of the invention preferably achieves visual differentiation by adjusting at least one pumping variable of one component differently from the other component. These variables are selected from the group consisting of a pumping rate, a pumping time, a discharge cycling mode and combinations thereof.

In another preferred aspect of the method, one of the food components has physical and visual attributes that differs from the other component. In particular, a first component may be an acidified dairy component and a second food component may be a fruit-based or colored sugar or sugar-like component. The first component may have, but is not limited to, a white dairy product and may have a density that is lower than the second component. The second component may be the primary flavored component for the first component that enhances its visual and flavoring characteristics in the cup. The second component may be added in lower or equal amounts to the first component depending on the final taste and visual effect that is desired. According to the method of the invention, it may be advantageous to achieve improved visual effects and prevent mixing of the components together by dispensing the higher density component at a relative slower rate and the lower density component at a relative higher rate. In an even preferred aspect of the method, it may be advantageous to discharge the lower density component, e.g., a dairy component, by providing a central flow of the component and, to discharge the higher density component, e.g., a fruit sauce, by providing a peripheral flow substantially adjacent to the central flow of the lower density component. Even more preferably, the innermost component, e.g., the dairy one, is dispensed at a flow rate of from about 10 to 30 grams/second and the outermost component, e.g., fruit based one, is dispensed at a flow rate of from about 2 to 20 grams/seconds.

The resulting products represent yet another embodiment of the invention.

DETAILED DESCRIPTION OF THE PREFERRED EMBODIMENTS

The present invention advantageously provides a foodservice device and method for dispensing on demand a refrigerated but non-frozen spoonable or drinking food product with unique customized appearance. Preferably, the device is used for delivering at least two of such spoonable or drinking food components for each single portion of food delivered in the container. The at least two food components are visually and/or organoleptically distinctive in the cup. The invention offers the possibility to achieve visual and/or organoleptic effects by delivering said components in a non-homogeneous but controlled manner in the cup. The invention can impart to the portion of food various visual designs that would make the food portion attractive for the consumer. The invention provides more flexibility and convenience to the foodservice operator. The invention may propose a product with an improved appearance in a menu or at the customer's request. This avoids the need for the operator to hand make the food product or to order and store products that are prepared at a centralized food preparation center such as in manufacturing facilities. The product retains its fresh and quality appearance as it is proposed to the consumer after immediate dispensing from the device and, therefore, it is less subjected to bleeding effect, syneresis, crystallization, or potential contamination normally caused when the product is produced in a remote local or manufactured in advance in an industrial facility.

Figure 1:
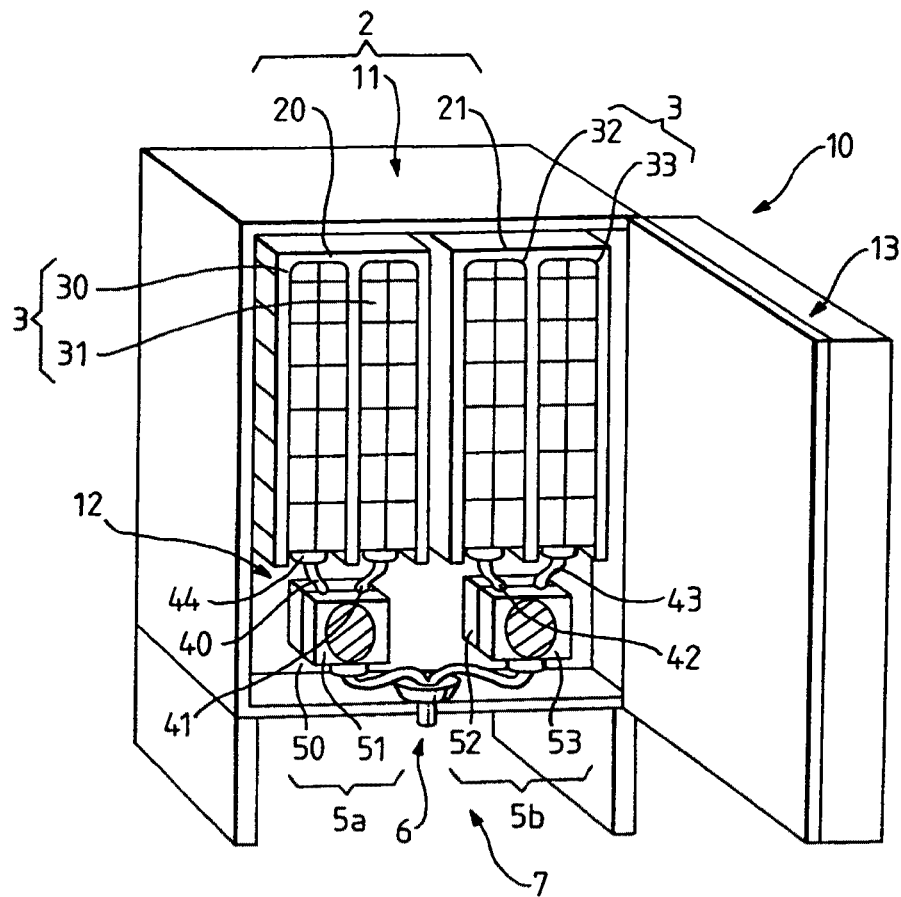
FIG. 1 is a perspective view of the dispensing system of the invention in which the front door is opened for providing a view on the main internal parts.
Figure 2:
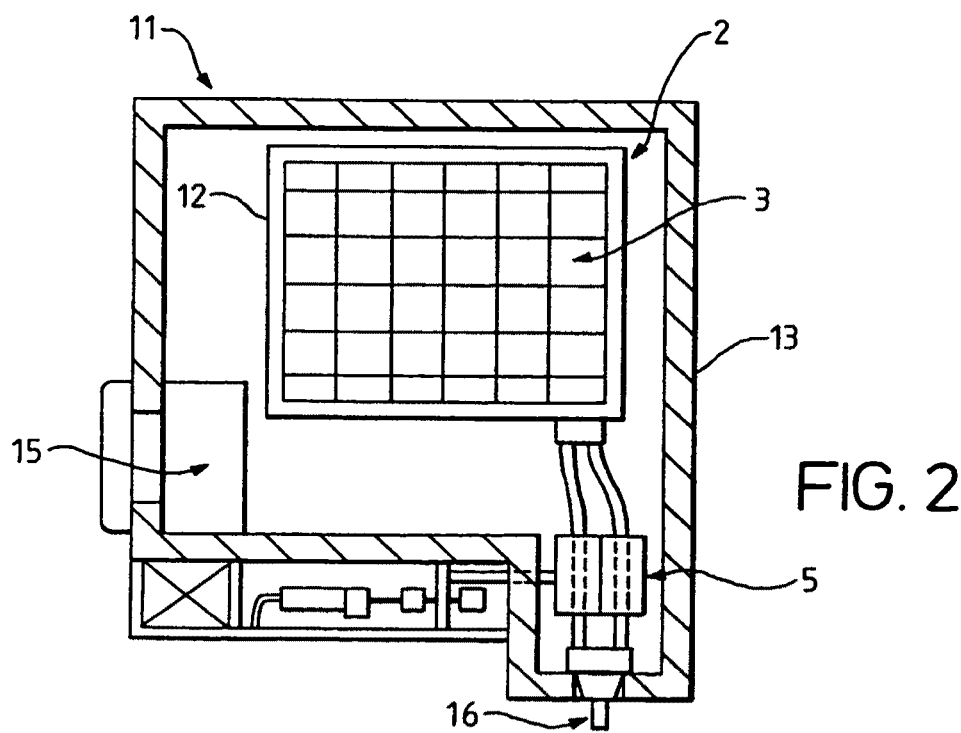
FIG. 2 is a schematic section view of the dispensing system of FIG. 1.

FIGS. 1 and 2 show a diagrammatic dispensing system of the invention of a preferred embodiment. The device 10 is a dispensing machine that can be installed in any restaurant, fast food establishment, cafeteria, convenience or grocery store or other foodservice or catering area. The device comprises a housing 11 defining together with a front door 13 an internal volume 12. The front door can be hinged to a side of the housing 11 to be conveniently opened by the operator. The housing and front door are both insulated by insulating materials such as thermally isolating plastic so that the inside temperature in the volume 12 can be maintained to a controlled level that is adapted to the refrigerated food components stored therein.

In a preferred aspect, the invention is adapted to dispense spoonable or drinkable products that are served chilled to the consumer; i.e., at a refrigeration temperature preferably of from about 2 to 8° C. The control of the refrigeration may be obtained by any refrigerating systems 15 known in the art such as by gas cooling effect, thermoelectric cooling effect (TEC) or any similar systems. Preferably, a circulation of cool air is produced by a fan or similar air forcing system within the housing so that there is very little risks of finding temperature variations in both vertical and horizontal directions within the housing.

The removable flexible bags 3, 30, 31, 32, 33 usually known as "bag-in-box" type of bags or flexible pouches each contains a food product having different characteristics. We refer herein by "different characteristics" to the attributes that would make one component clearly differentiable from the other component such on the point of view of the flavor, color, viscosity, taste or even possibly odor. Preferably, the food components have a different visual aspect that clearly appears to the observer when the components are placed in an adjacent position one another in the container. The components should have a texture at the temperature of storage that allows transport through the pumping system 5. The visual differentiation may be furthermore obtained by the addition of solid or semi-solid inclusions, edible pieces or grains provided the overall texture of the components is not altered to an extent that would make the components no more pumpable. In an even preferable embodiment, a first component may be an acidified dairy product. As an example, a dairy product may be an acidified milk, a yogurt, a spoonable cheese or sour cream. In the example illustrated here, a first dairy component may be stored in bag 30 and a second dairy component may be stored in bag 31. The first dairy component may preferably have a viscosity higher than the second dairy component. For instance, the first dairy component contained in bag 30 may be spoonable at chilled temperature while the second dairy component contained in bag 31 may have a texture closer to a drink at the same temperature. A third and fourth components may preferably be fruit based or flavored components. A fruit based or flavored components may be a slurry, a syrup, a sauce or a jam with or without fruit pieces. The fruit based or flavored components may be artificially or naturally flavored. They may contain sugar or sugar substitutes, humectant(s), water, optionally stabilizer(s), an so on, so as to make a pumpable mass. For instance, the third component is contained in bag 32 and is a strawberry sauce while the fourth component is contained in bag 33 and is a raspberry sauce. In the case of one component is a dairy component and the other component is a fruit based component, one may obtain a clear visual differentiation when the two components are not thoroughly mixed together during dispensing but remain in two substantially separate phases in the container. The dispensing principle of two components of distinctive characteristics will be later explained in the description.

The housing comprises support elements 2 for supporting the packaged food products 3 in the housing. More particularly, the support element comprises slidably removable baskets 20, 21 located in parallel in the upper part of the housing. The baskets 20, 21 are preferably designed to receive disposable flexible pouches or bags 30, 31, 32, 33. The baskets are preferably made of wire netting elements that provide sufficient support for the bags and restrict them in a given volume in the housing while leaving sufficient openings for the cool air to circulate around the surfaces of the bags for a good refrigerating transfer to the food components contained in the bags. A number of baskets may be provided that matches the number of bags. However, this is not necessary and one can accommodate two or even more bags in one single basket depending on the size of the baskets. Importantly, the basket should be sized so that the bag or bags fit the internal shape of the bag while not collapsing too much as it would possibly create flowing problems of the components out of the bags. Alternatively, a disposable corrugated paper or plastic structure may be used in lieu of a basket, e.g., a standard Bag-in-Box type format. The bags comprise individual flexible hoses 40-43 individually attached to the bags via fitments 44. Each bag has its own flexible hose that is threaded through an individually controlled volumetric displacement pumping device 50-53. For reasons that will be later explained in details, the pumping devices are preferably grouped to form distinct pump assemblies 5a, 5b. A positive displacement pump is preferred as it provides with reliable and precise dosing of the two components. Furthermore, there is no direct contact with the food. A suitable positive displacement pump is a peristaltic pump usually used in the foodservice industry for transporting viscous food products through discharge tubes. The pumps are secured beneath the storage area so that the discharge tubes or hoses passes through the pumps between a rotor and a stator member of the pumps. The rotor member is driven in rotation and has generally regularly spaced pinch rollers that progressively impinge on the discharge tubes. In this manner, a predetermined volume of food product is moved axially through the discharge tube and is dispensed at a rate determined by the speed of rotation of the rotor. The pumps are maintained in the zone of the housing which is temperature controlled so that the product that may remain in the tube between two servings is kept at a controlled temperature.

Importantly, one pump is associated to one component and is independently controllable in on/off modes under the influence of a control unit. The number of pumping devices and pump assemblies is not limited and depends on the capacity and complexity of the dispensing device that is desired. In the present example, there are four different bags 30-33 leading to four different hoses 40-43 that engage four individual pumps 50-53 wherein the pumps are grouped by two, therefore, forming a pair of separate assemblies 5a, 5b. Further downstream of the pumping assemblies is provided a nozzle assembly 6 that realizes the connection from the inside refrigerated volume 12 to the external dispensing station or area 7. As will explained later on in the description, the nozzle assembly receives all the hoses from the bags and is capable of dispensing the food components toward a cup or glass disposed properly in the dispensing area. The food storage, hoses, pumps and, at least, parts of the nozzle are pieces that are maintained in refrigerated conditions within the insulated housing in conditions close to adiabatic conditions of temperature during the dispense of the product. Only a small lower part of the nozzle may emerge from the housing to deliver the product in the cup in the dispensing area 7. It may be envisioned to even enclose the nozzle discharge section within the refrigerated area and to increase the refrigeration capacity accordingly.

Figure 3:
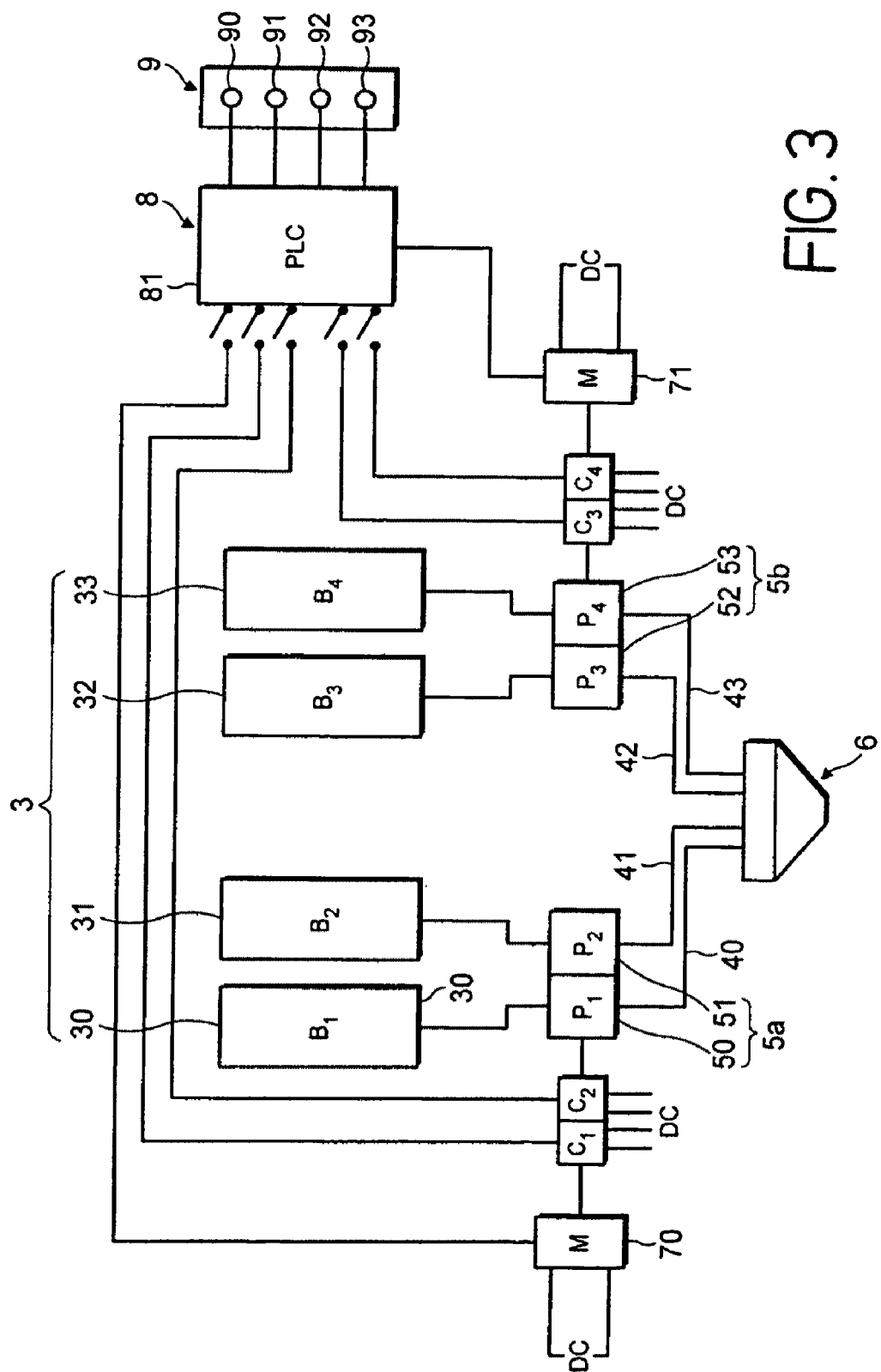
FIG. 3 is a schematic illustration of an exemplary control arrangement of the dispensing system of the invention.

Referring now to FIG. 3, the dispensing device of the invention comprises a selection switch board 9 for the consumer to be able to make a choice of spoonable or drinkable products. The selection switches 90-93 will be explained in connection with the control system described hereinafter. A central controller 8 is also provided in electronic communication with the switches 90-93 to execute the selection(s) operated by the consumer. The controller 4 may be a programmable logic controller (PLC). The controller posses sufficient memory and processing power to store preprogrammed information relative to the product recipes to be dispensed according to the choice made by the consumer by selecting the switches and to send appropriate signals for regulating the appropriate variables to the relevant mechanical elements of the system. An example of suitable PLC unit is available from Siemens. In an alternative embodiments, the controller can be implemented in electronic digital gates, microprocessors, Digital Signal Processing (DSP) chips, Application Specific Integrated Circuits (ASICs), or other electronic circuits available to one of ordinary skill in the art.

According to one important aspect of the invention, each pump 50-53 can be operated independently. We refer to "independent control" here to the capacity to activate the pumps either simultaneously or separately or to maintain the pump(s) deactivated during the dispense of one portion of food in the cup. Independence of the controlling for each pumping device may be operated according to a wide range of possibilities. In another embodiment, the flow rate of the pumps 50-53 can be varied to achieve different product patterns and/or component ratios in the cup.

Variation of the flow rates may also be achieved by a wide range of possibilities. Some examples may be: a) by the automatic adjustment (via PLC control or other equivalent control means) of a variable resistance device in the pump motor electrical supply or b) by the use of different fixed motor speeds use to run a specific group of pumps on a given motor or a combination of a) and b).

The following description relates to a preferred embodiment but should not be construed as the unique solution for practicing the invention.

Figure 4:
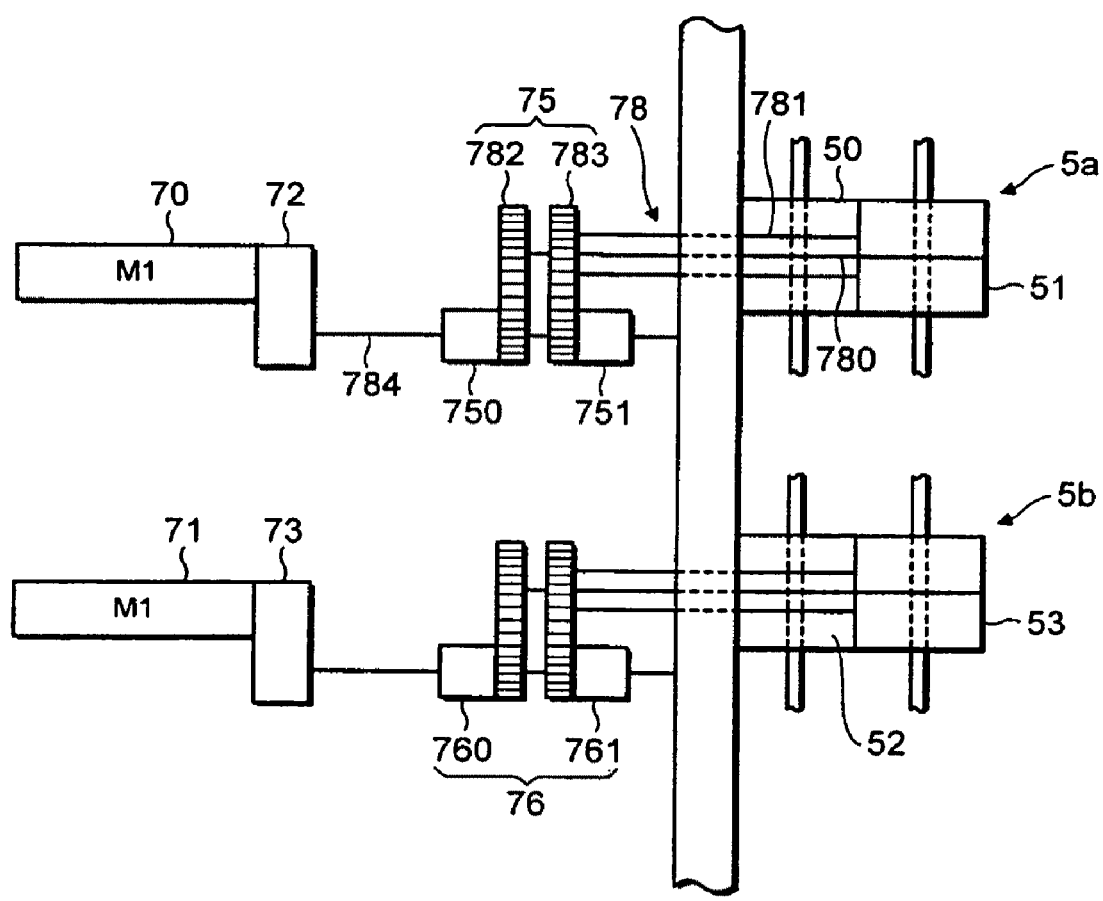
FIG. 4 is a schematic illustration of the pumping and clutch mechanism of the invention that allows various changes of the dispensed food product according to the exemplary control arrangement of FIG. 3.
Figure 5:
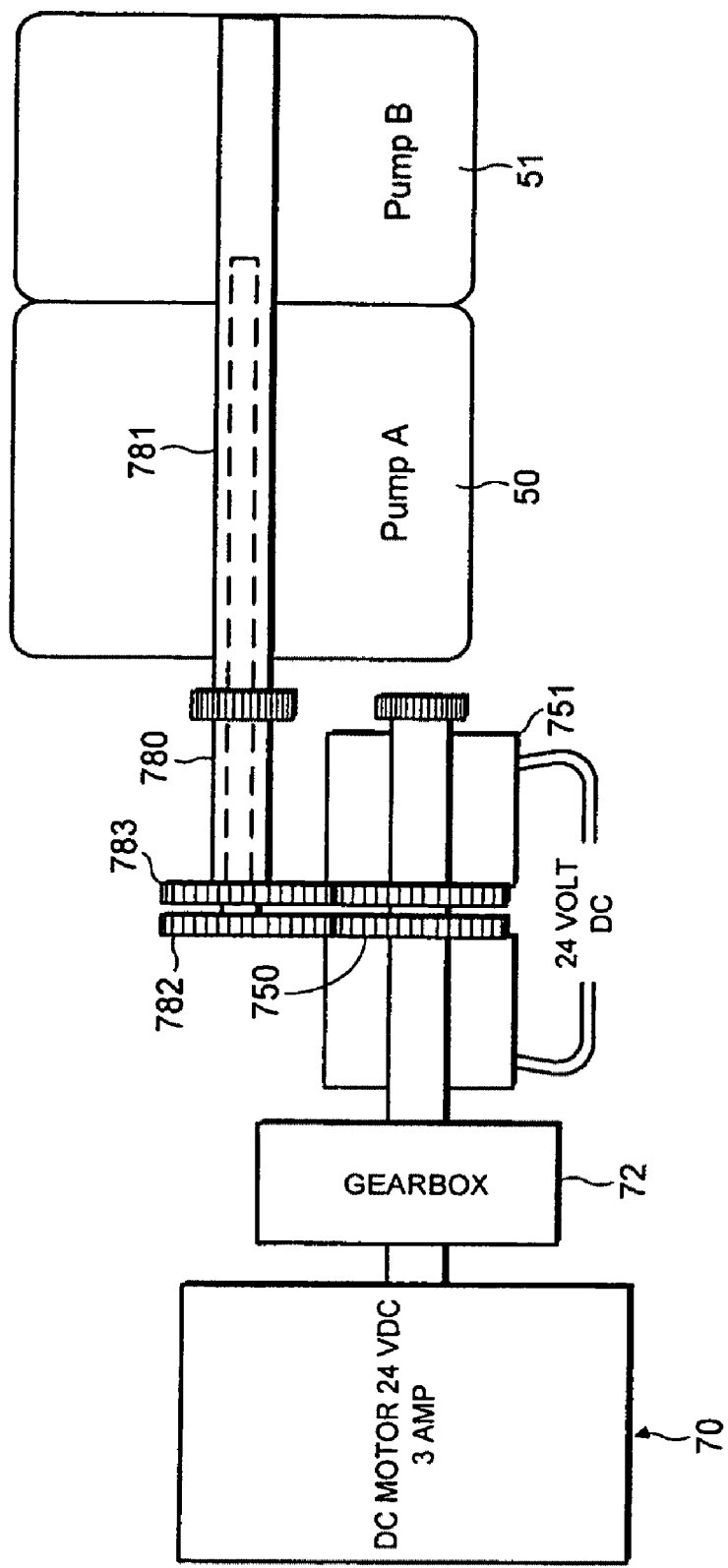
FIG. 5 is a schematic illustration of the pumping and clutch mechanism of the invention.

In reference to FIGS. 4 and 5, the process control system is utilized to control on/off actuation of a pair of motors 70, 71 each of which drives one pumping assemblies 5a, 5b as identified previously. Each motor 70, 71 connects to a clutch assembly 75, 76 optionally via a reducing gearbox 72, 73. The motor being used may be standard 24 VDC 3 Amp motors which turn at about 3500 to 5000 RPM and deliver a certain torque. The reducing gearbox takes in the motors output shaft through use of a 5:1 to 10:1 reduction enables the output shaft from the gear box to turn at about 300 to 1000 RPM which in this case is needed by the pumps. This is done by gear to gear power transfer whereby the circumference of the gear on the gearbox output shaft is 5 to 10 times in circumference larger than the motor output shaft gear which drives it.

The clutch assembly selectively driving each pumping assemblies is formed from a pair of electromagnetic clutch 750, 751 and 760, 761 that is capable of activating the pumps either simultaneously or separately. Now, for a better understanding of the mechanical details, we refer only to the clutch assembly driving the pump assembly 5a knowing that the second clutch assembly works according to the same principle.

The pair of magnetically operable clutches 750, 751 is connected to a multi-piece drive shaft 78. The drive shaft comprises concentrically disposed shaft portions 780, 781 that are each linked to a different pump 50, 51. More particularly, a first shaft portion 780 is an inner shaft portion that connects the more distant pump 51 and a second shaft portion is an outer shaft portion of shorter length that connects the closer pump 50. On their opposite ends, the shaft portions are individually connected to separate drive gears 782, 783, each comprising a pair of wheels, mounted on the clutches 750, 751. In particular, drive gear 782 of clutch 750 is connected to inner shaft portion 780 so as to activate pump 51. Similarly, drive gear 783 of clutch 751 is connected to outer shaft portion 781 so as to activate pump 50. Each clutch is preferably a magnetic spring clutch such as those distributed by Helander Products Inc. under the commercial name Tiny-Clutch®. The clutch comprises a wire spring that fits loosely over two adjacent hub drums. A first hub drum is securely attached to its respective drive gear while the other hub drum is the shaft hub securely linked to the gear box 72 of the motor via an axle or shaft 784. An electric coil is provided in a coil housing anchored to a fixed point of the shaft hub. When the coil is de-energized, the hub and shaft are free to rotate independently. When the coil is energized, the control armature of the clutch is attracted to, and adhere to the shaft hub flange, causing the spring to wrap down. The hubs are thus coupled together, and rotate as a unit. In such a configuration, when the DC motor is activated, the shaft of the motor drives the gear which consequently drives the shaft of the selected pump. Other types of clutches could be used as well such as electromagnetic springless clutches that uses the principle of the electromagnetic field pulling two disks together which have friction material on their surfaces. When held by the electromagnetic field, both the input and output disks turn and, when power to the clutch is taken away, only the input disk can turn. Such a clutch is commercialized under the reference SF-170 by Warner Electric Company.

Therefore, in order for one pump 50, 51, 52, 53 to be operated, its associated motor 70, 71 must be turned on and its associated clutch 750, 751, 760, 761 must be engaged; i.e., its coil stimulated by a direct electrical current. The clutches and motors preferably use DC low voltage/low amperage current; e.g., 24 VDC and between 0.2 to 3 Amps. Therefore, as illustrated by FIG. 3, the electrical activation of the motors 70; 71 and clutches 50, 51, 52, 53 is monitored by the main controller according to a preprogrammed schemes stored in the memory of the controller that fits a choice of product recipes. When the consumer presses on a selection switch, the selection is sent to the main controller which executes the programmed scheme which corresponds to the selection. The main controller activates or deactivates the relevant motors and/or relevant clutches by means of time-controlled relay switches 81 necessary for the operation of the physical device. For instance, if the selection switch 90 is pressed, the controller may activate motor 70 and 71 simultaneously for driving both pumping assemblies 5a and 5b together but with only clutches 750 and 761 being actually energized. As a result of this selection, only pumps 51 and 52 are selectively driven as illustrated in FIG. 4. Consequently, the pumps 51 and 52 simultaneously draw the product component contained in bag 31; e.g., a drinkable dairy and the product component contained in bag 32; e.g., the strawberry sauce. In an alternative embodiment, the selection of other switches may activate motors 70 and 71 sequentially; i.e., one after the other, with possible pauses between each sequence, and may activate clutches also sequentially in the same phase with the motors activation-deactivation. For instance, the selection of switch 91 may drive motor 70 and 71, one after the other, according to several sequential modes and clutches 50 and 53, for example, also sequentially in phase with the motors, so that it may result in the delivery of a layered pattern of the food component contained in bag 30; e.g., a spoonable acidified dairy component, and the food component contained in bag 33, e.g., a raspberry sauce.

Importantly, it should be noted that different flow rates can be operated by the dispensing device to achieve different patterns and/or different component ratios in the cup. The flow rate for each pumping line may be achieved by operating the motors at different speeds such as by using a variable power supply. This can be done electronically by use of a fixed resistance added to a DC electrical supply to vary the DC motor(s) to a desired speed or mechanically by use of different gear ratio's on the drive shaft from the motor(s) to the pump heads.

Figure 6:
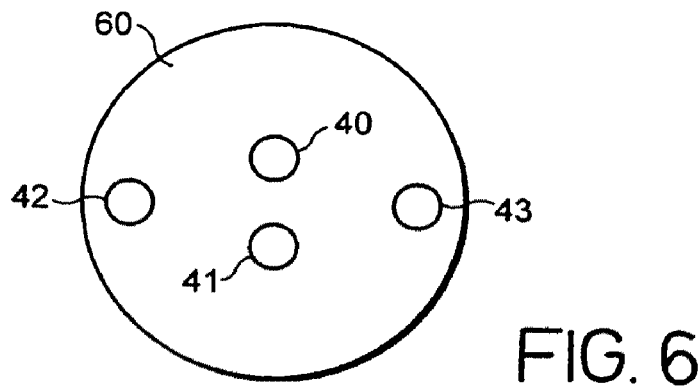
FIG. 6 is a schematic top view of a merging device according to a first preferred embodiment.
Figure 7:
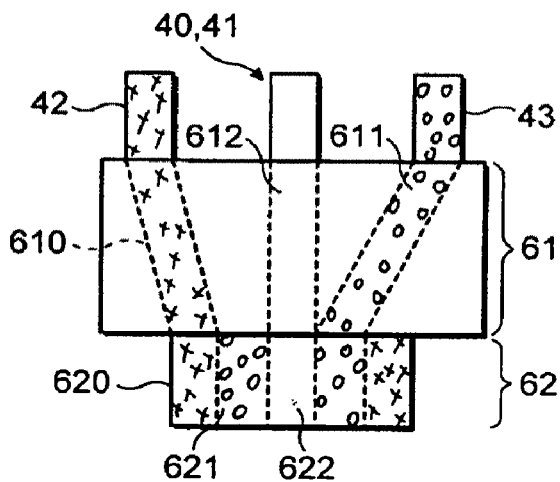
FIG. 7 is a schematic side view of the merging device of FIG. 6.
Figure 8:
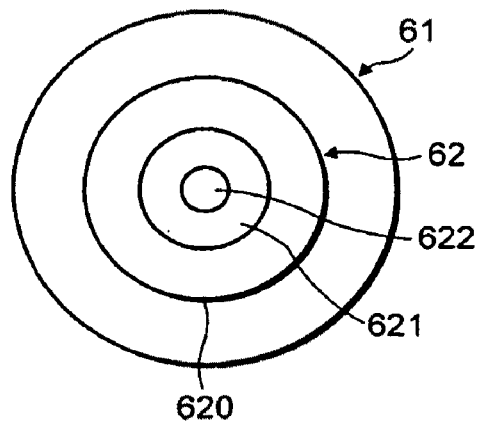
FIG. 8 is a bottom view of the merging device of FIGS. 6 and 7.

Now referring to FIGS. 6 to 8 is illustrated an exemplary nozzle assembly 6 that fits to the dispensing device to dispense multi-components in the cup while achieving various appealing patterns. The function of the nozzle is to provide the means to integrate the product components, e.g., the four product components, to a directed area, preferably centrally located area, of the dispenser where upon selection pumping of one or more product components will, through the design of the internal nozzle channels, allow the product components to substantially merge while not intimately mixing together. An important function of the nozzle is also to emphasize the visual appearance of the components in the cup.

The nozzle assembly comprises a top surface 60 with a plurality of holes adapted to receive the hoses 40, 41, 42, 43 of the bags 30, 31, 33. Each product component uses its own separate tube receiving hole. For example, hoses 42 and 43 can be connected to a source of fruit sauce or flavoring, while hose 40 is connected to a source of "spoonable" yogurt and hose 41 is connected to a source of "drinkable" yogurt. As the connection is made removable, once a bag becomes empty, the entire bag and hose assembly can be replaced and another bag with a new hose can be plugged in the pumping assembly and into the nozzle's holes. The nozzle comprises an upstream portion 61 whose function is to continue the holes at different separate locations for the hoses and downstream concentric centralized deposition portion 62 for each product component to distribute separately along a series of concentric zones 620-622 so that merging of the components is achieved without mixing. Preferably, the upstream portion 61 has relatively small diameter channels 610-612 which separately communicate with the concentric zones 620-622. Channel 610 communicates with the outermost concentric zone 620. Channel 611 communicates with the intermediate concentric zone 621. Channel 612 merges the two holes for the tubes 40, 41 and communicate with the innermost concentric or central zone 622. Preferably, the fruit or flavored sauces, syrups and similar are preferably dispensed through separate channels in communication with separate concentric zones 620, 621 while the two dairy components can transit through the single zone 622.

Therefore, as far as different fruit types are concerned, such a nozzle configuration provides the added benefit of avoiding any cross-contamination of the two fruit types, i.e., dispensing one favor after another cannot lead some of the first fruit type dispensed in the second product. The inner concentric zone of the nozzle is shared by both dairy components but it is not prejudicial to the resulting patterns in the cup as cross-contamination would not be noticeable. Also preferably, in a more general manner, the hoses transporting the fruit and flavored types 42, 43 are installed in fluid communication with concentric zones 620, 621 that are positioned more externally as compared to the delivery zone 622 for the dairy components. As a result, the fruit or flavored part has a tendency to reach more rapidly the side of the container as it settles in the cup after dispense, therefore, requiring a lesser amount of this component for the same visual effect in the cup.

Further features may be taken into consideration such as the size of the concentric delivery zones relative to how long the nozzle needs to be. However, the refinements for optimal results are deemed to be within the level of ordinary skill in the art.

Figure 9:
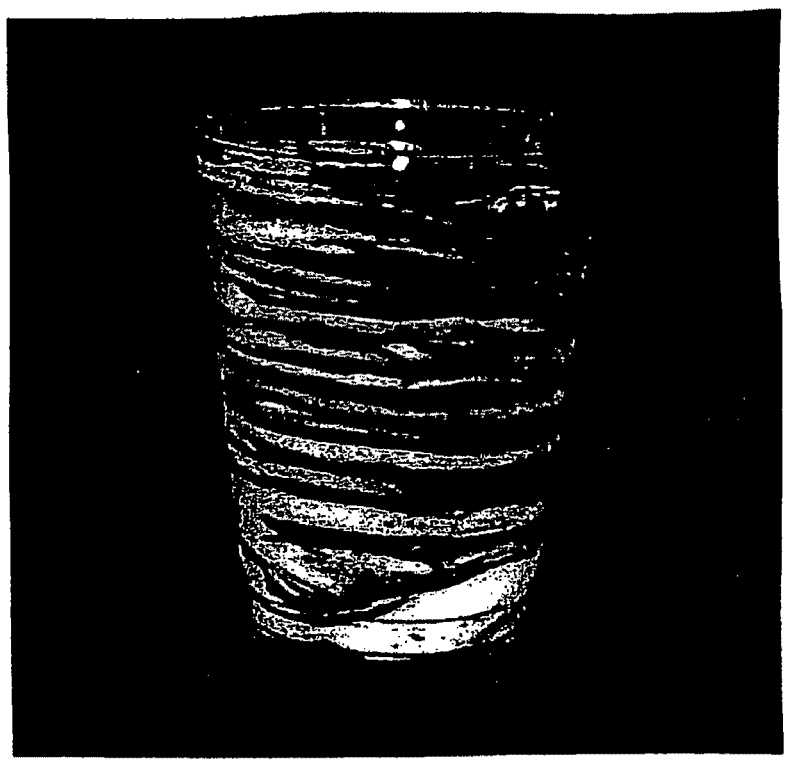
FIG. 9 is a photograph of one preferred embodiment of the on-demand dispensed food product in a swirled configuration of two different components; one is a yogurt component and the other is a fruit sauce.
Figure 10:
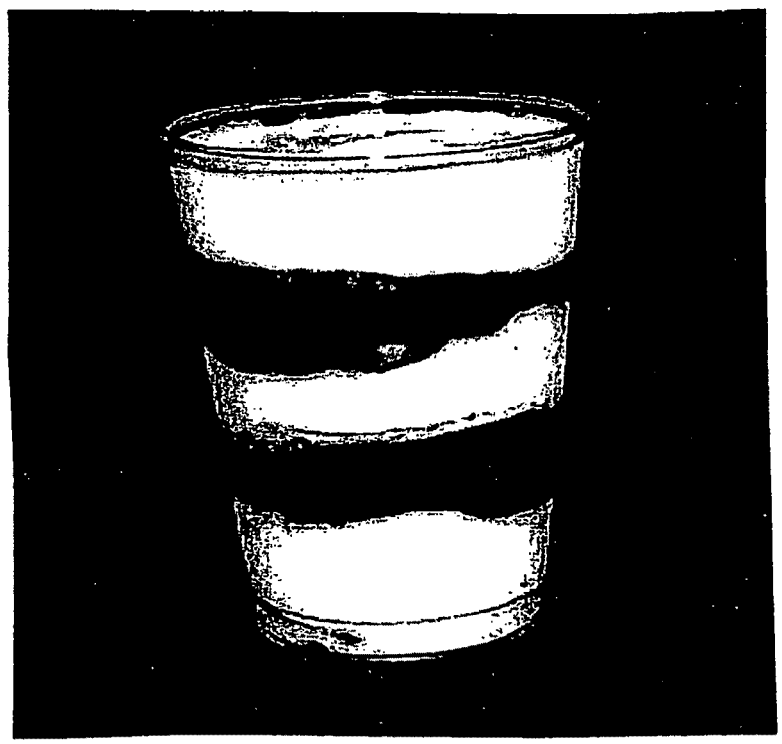
FIG. 10 is a photograph of another preferred embodiment of the on-demand dispenser food product in a "parfait" type of product of two different components comprising superimposed layers of yogurt and fruit sauce.
Figure 11:
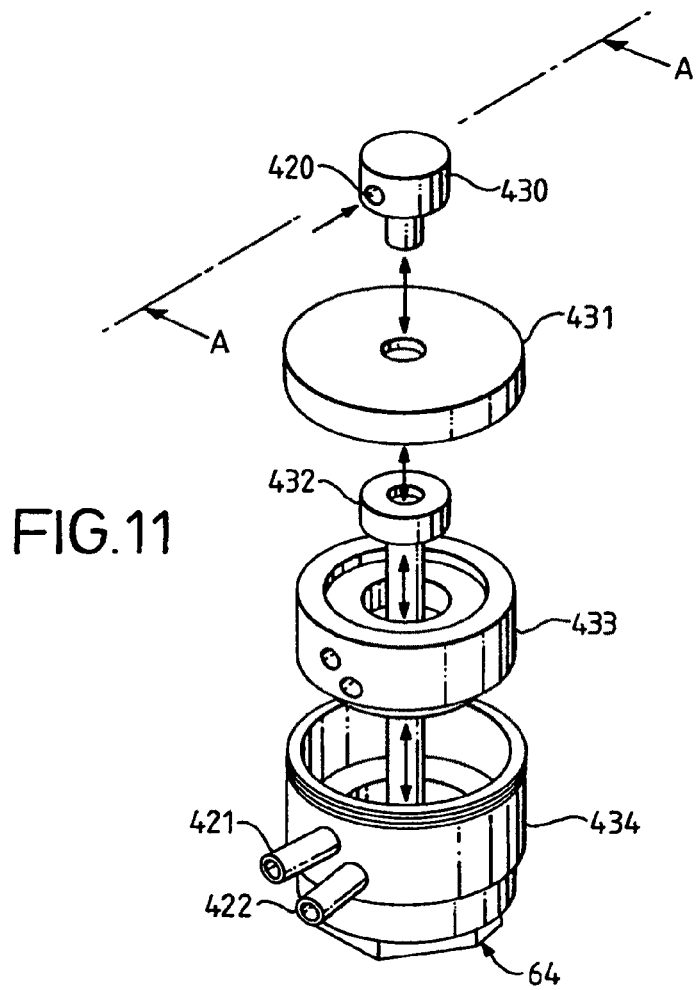
FIG. 11 is an exploded view of another possible embodiment of a nozzle configuration of the invention.
Figure 12:
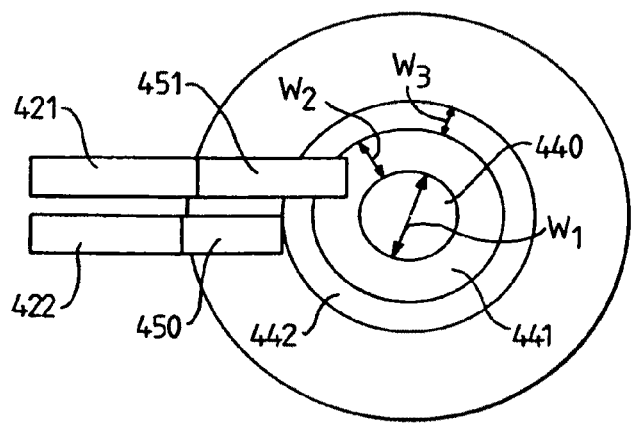
FIG. 12 is a schematic view of the nozzle of FIG. 11 showing the concentrically arranged fluid communication paths within the nozzle.
Figure 13:
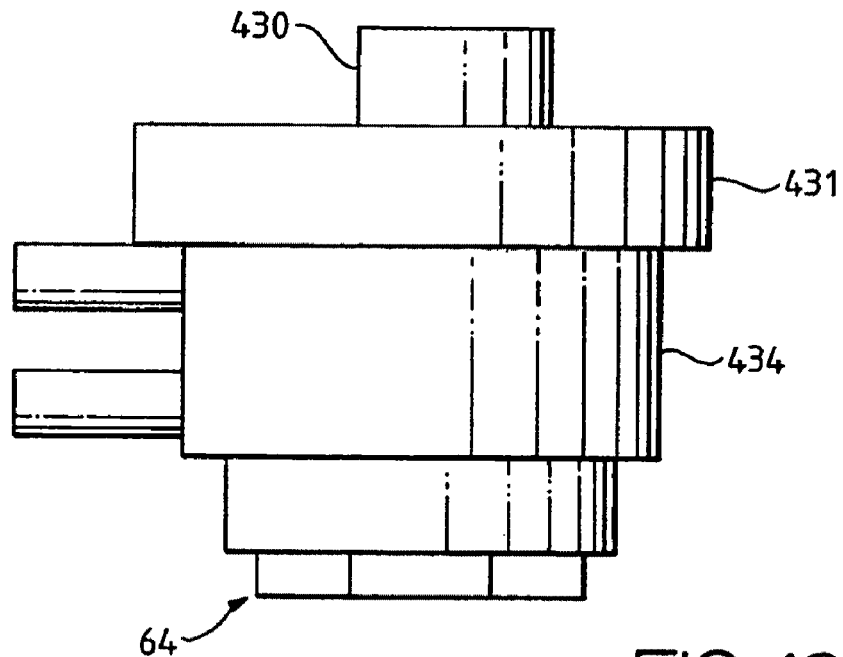
FIG. 13 is a side view of the nozzle of FIGS. 11 and 12.
Figure 14:
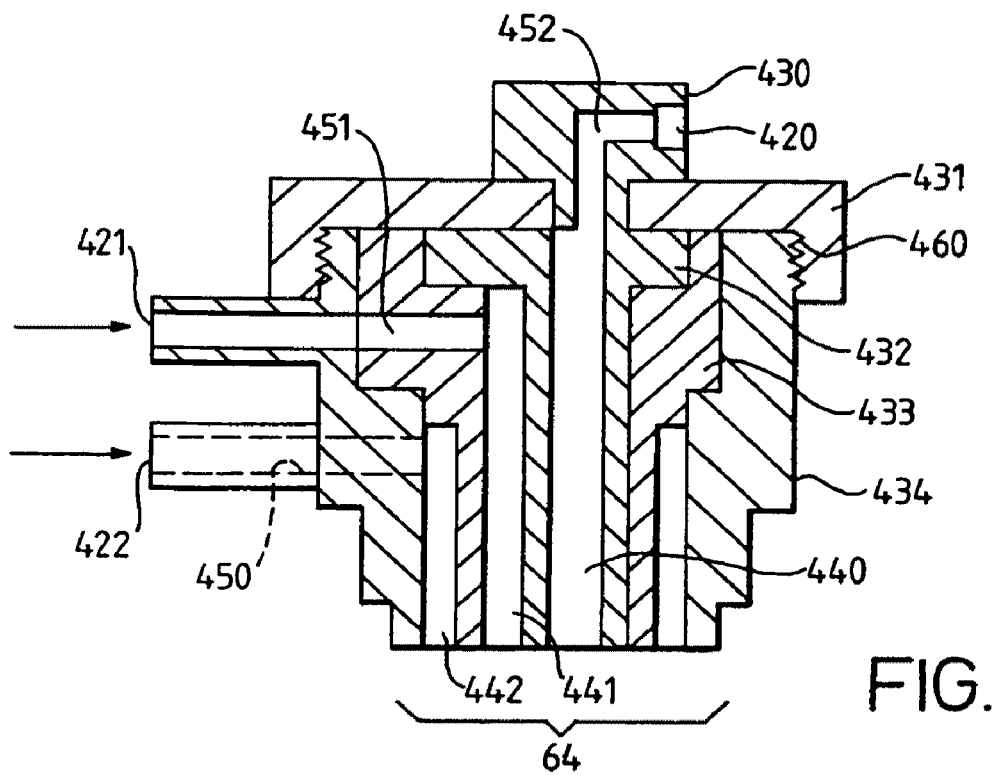
FIG. 14 is a cross sectional view along plane A-A of the nozzle of FIG. 11.

FIGS. 9 and 10 illustrates preferred examples of on-demand delivered food products according to the method and device of the invention. It must be noted that the delivery of those products may depend upon various important factors such as the rate at which the product components are pumped, whether individually or in combination, the sequence and duration of pumping, possibly, in combination with the dispensing container design and distance the container is maintained from the nozzle during the dispense.

The on-demand dispensed food product of FIG. 9 illustrates an exemplary of a swirled freshly dispensed product in which an acidified dairy product is combined to a fruit based or others similar artificially or naturally flavored and/or colored component. In order to achieve the appearance as shown, the two components are dispensed simultaneously at different pumping rates. The pumping ratio of the acidified dairy component to fruit component is between about 9:1 to 1:1, and preferably from about 6:1 to 2:1. The flow rates of the individual components when simultaneously co-dispensing, e.g., 3:1 of yogurt to fruit ratio, control the final amounts of each product component in the cup, e.g., 75% and 25% fruit. We found the two components need to be dispensed simultaneously at such preferred ratio values so that a swirled appearance is obtained while not providing clear demarcations between the two components in the cup. The sides of container, at least, need to be transparent or translucent to bring to the fore the visual and unique colored pattern. The fruit or flavored and/or colored component and/or the dairy component may also contain pieces such as fruit pieces, grains, cereals, etc. that may stress the visual appearance of natural and healthy product in the cup.

The on-demand dispensed food product of FIG. 10 is a layered pattern that illustrates another exemplary product obtained by sequentially dispensing predetermined doses of a first component and a second component of distinctive color and texture. The first component is pumped and delivered in the cup at a flow rate that may be different to the second component. In the case of layering product components, we use the flow of the centrally dispensed yogurt at a higher rate to physically push a previously dispensed fruit layer radially outward so that it is visible on the outside of the transparent serving container. In order to achieve a good layering effect, it can be advantageous, depending on the densities of the product components, to dispense the higher density component (e.g., fruit sauce) at a relative slower rate to effect essentially a surface depositing on a previously dispensed lower density component (e.g., yogurt). If the higher density component (e.g., fruit sauce) is dispensed at a too fast rate, i.e., too high velocity, it can, by the force, mix with the lower density component (e.g., yogurt) instead of laying on the surface which is the desired result. The sequencing of the product components dispensing creates the layers. Preferably, each sequence is separated by a pause to allow the layer to settle; i.e., to move gently from the central deposition point in the cup to the sides of the cup so that a layering aspect becomes more visible with less product used. In particular, the nozzle design as aforementioned distributes the layers and directs the subsequent injection of product to the center of the layer, by force, radially outward to the inner side of the cup. The pumping flow rate differential; i.e., pumping ratio, and the specificity of the food product, i.e., yogurt or fruit sauce, are controlled to effect radial outward forces for the layers to settle. We use the flow of the centrally dispensed yogurt at a higher rate to physically push a previously dispensed fruit layer radially outward so that it is visible on the outside of the transparent serving container. This allows to externally have a wide fruit sauce stripe the appearance of more fruit sauce being present. Thus, more preferably, the food components are pumped to a pump rate of from 1 to 40 grams per second, even preferably of from 2 to 30 grams per second. For an acidified product, the pumping rate is approximately of from 10 to 30 grams per seconds while for a fruit sauce, the pumping rate is approximately of from 2 to 20 grams per seconds, preferably 5 to 15 grams per seconds. A pause is preferably respected between each dosing sequence of from 0.5 to 5 seconds, preferably 0.5 to 1 second to allow each layer to settle down in the cup. As a result a "parfait" type layered product is achieved that comprises superimposed layers of the first and second component in an alternate pattern as shown. The product can be made immediately available to the consumer. The layers are sufficiently separated and have settled properly so that the product experiences a stability of several minutes without the fruit layers significantly bleeding in the yogurt layers.

FIGS. 11 to 14 illustrate a variant of the previous nozzle according to the invention which can be easily dismantled for easier cleanability. The food products that can be produced with such a nozzle are similar to the ones illustrated in FIGS. 9 and 10. The nozzle comprises three component inlet ports 420, 421, 422 and is constructed of five separate "readily cleanable" parts 430, 431, 432, 433 and 434. The five separate parts are capable of assembling together to form three separate and distinct concentric product flow channels 440, 441, 442 to enable a given component entering one of the three inlet ports 420-422 to remain separate from the others, i.e., unadulterated, so as to avoid any premixing or cross contamination of separate components through the nozzle. The nozzle comprises a main external body member 434 that receives along its central axial cavity a first hollow insert head 433. The insert head and the body member complementary fit and secure together in abutting relationship so as to define an outermost flow channel 442 for a first component to flow therethrough. Flow channel 442 is in fluid communication through a radially oriented fluid line 450 provided in the body member the outlet 422. The first insert head 433 has an internal concentric axially oriented channel 441 for a second component coming from a second radial fluid line 451 provided in the insert itself that prolongs further in the body member until said second outlet 421. The second channel 441 is demarcated by said first insert head 433 externally and by a second insert head 432 internally. The second insert head 432 has a portion of smaller section to fit axially in said first insert 433. In its upper part, the inner insert 432 has a larger flange that locks it in place in position in the first insert. Second head insert 432 is traversed axially by a central axial channel 440 which communicates with the fluid line 452 of an elbow fitment 430 in the top part of the nozzle. The fitment is shaped to fit into place in a hole of an upper cap member 431. The cap member 431 ensures with the body member a close and relatively tight internal arrangement of the inserts by a screwing connection 460 or similar connection means. The center tube channel 440 and the two radially concentric outer channels 441, 442 are shaped and sized with i) a cross sectional size to result in a dispensed product velocity needed for suitable form, distribution and force of the product component depositing into the serving container and, ii) the intent of having a channel gap of sufficiently small size to provide a capillary action type effect whereby undispensed product within the nozzle does not readily drip from the nozzle when no product is being pumped. Therefore, the channel sections have preferably a larger width, $w_1$, $w_2$, $w_3$ as apparent in FIG. 12, of from 1 to 10 mm, even preferably of from 2 to 8 mm to both provide the sufficient velocity and the capillary action type effect. Furthermore, the concentric ring or channel 442 intended for the flow of a first flavoring or coloring component is preferably made narrower than the concentric ring or channel 441 intended for the flow of a second flavoring or coloring component to maintain the cross sectional areas substantially constant so that the dispensed product velocity remains substantially the same considering the use of the same motor to drive both components. The nozzle assembly can discharge multiple different fruit, favor and/or color types and via varying the dispensing parameters such as velocity, ratio, sequencing, etc., multiple dispensed product appearances can be achieved. Preferably, the central channel 440 provides a fluid flow path for a base component such as plain yogurt and the two concentrically disposed channels 441, 442 provide separate fluid flow paths for more viscous and fruit and/or colored components such as fruit sauces without significant cross-contamination of the flavors. The top inlet 420 for the central discharge channel 440 may receive the connection with a "Y" type tubing element for allowing two white-in-color components to be discharged upon request, for instance, one spoonable component and one thick-shake drinkable component. It is important to note that such a nozzle assembly may encompass numerous variants. In particular, the number of channels may be increased by increasing the number of inserts in the nozzle thereby providing additional separate flow paths for additional components. The more types of differing components, the more channels and the more complicated the nozzle construction to keep full cleanability of the nozzle.

The nozzle assembly as described may reside in the refrigerated cabinet of the device and fit into a hole at the base of the cabinet providing a product discharge point 64 from the device.

Figure 15:
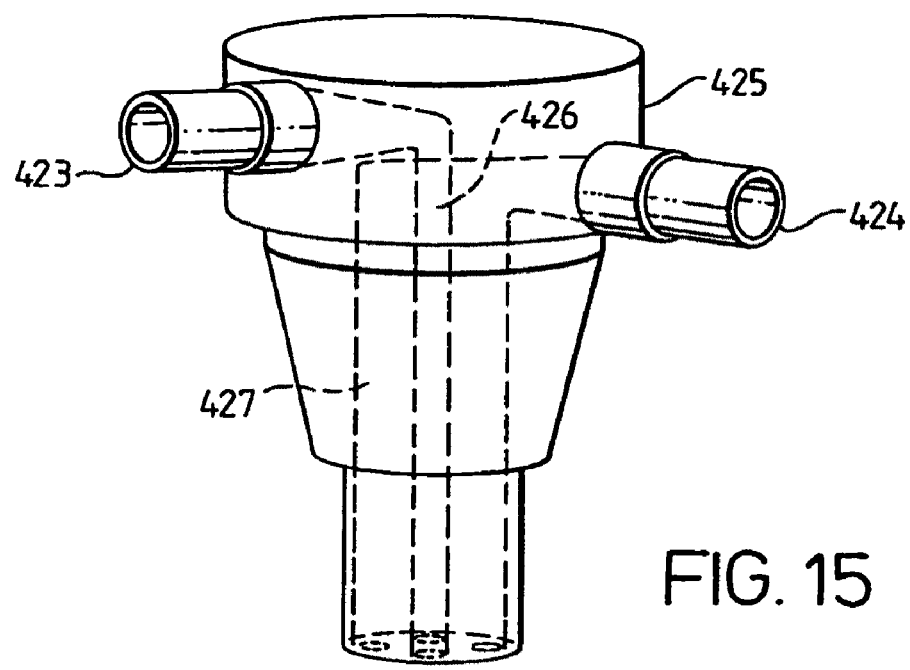
FIG. 15 is perspective view of another possible embodiment of a nozzle configuration.
Figure 16:
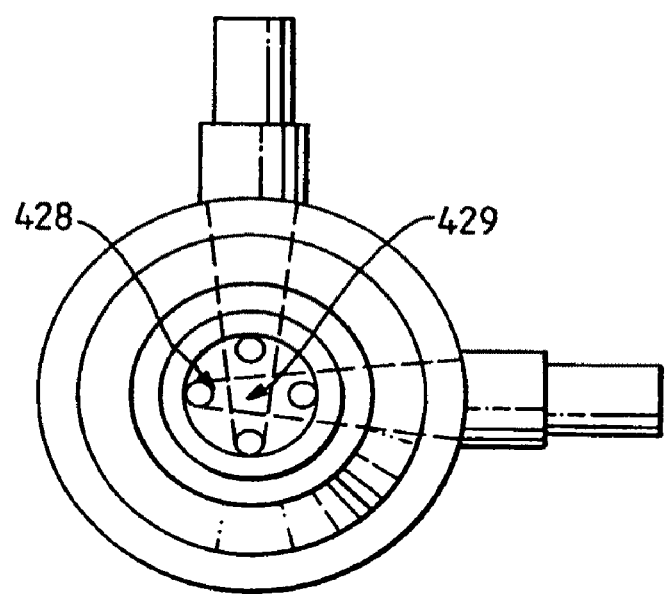
FIG. 16 is a bottom view of the nozzle of FIG. 15.
Figure 17:
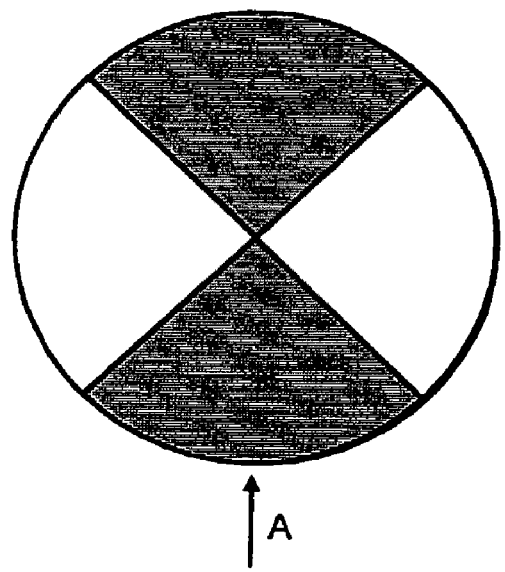
FIG. 17 is a top view of an on-demand dispensed multi-component food product in a container according to the configuration of nozzle of FIGS. 15 and 16.
Figure 18:
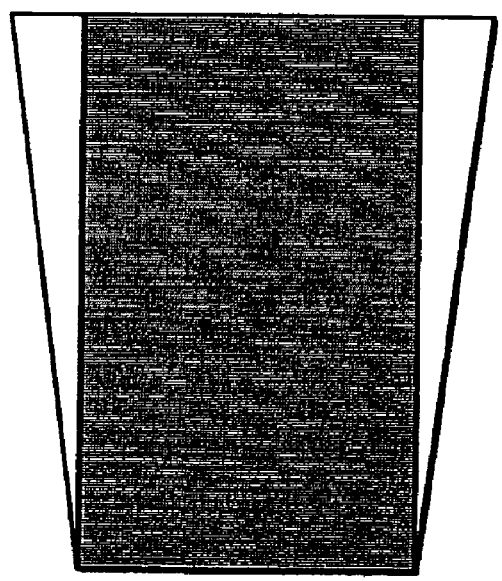
FIG. 18 is a side view of the food product of FIG. 17 as viewed from direction A.

FIGS. 15 and 16 illustrate a variant of nozzle and FIGS. 17 to 18 show which product pattern in the cup may result from this variant. The nozzle of FIGS. 15 and 16 has two inlets 423, 424 in a first upstream portion 425. Each inlet communicates through a conduit 426, 427 with a pair of discharge outlets 428, 429 located at the ends of a narrower downstream discharge portion of the nozzle. The two pairs of inlets form a square pattern of holes arranged so that the first component is discharged from two of the diagonally opposed outlets and the second component is discharged from the other two diagonally opposed outlets. As resulting from this arrangement, the dispensed product as seen from FIGS. 17 and 18 looking downward onto the top surface of the product in the cup has the appearance of being in four quadrants. Two diagonally opposed quadrants are constituted of a first component and the remaining two quadrants are mini-layered of the first and second components. For instance, the first component may be a naturally white colored dairy component such a yogurt and the second component may be a colored fruit component such as red fruit sauce. The dispensed product as viewed from the side of the cup appears as four alternating broad vertical stripes of white plain yogurt and mini-layered swirled portions of colored fruit and yogurt. In this example, the two components are co-dispensed so as to achieve a vertical separation of the components in the cup. Of course, the number of outlets and inlets of the nozzle is not limited and depends on the final design that is desired.

Figure 19:
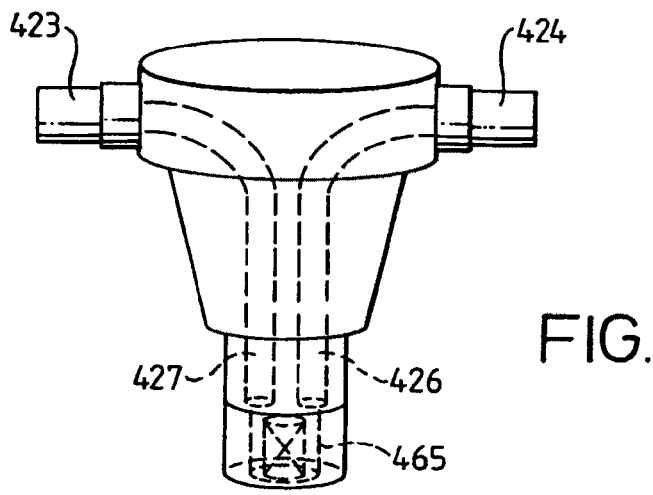
FIG. 19 is a perspective view of another embodiment of the nozzle.
Figure 20:
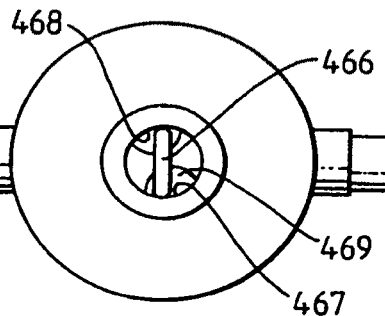
FIG. 20 is a bottom view of the nozzle of FIG. 19.
Figure 21:
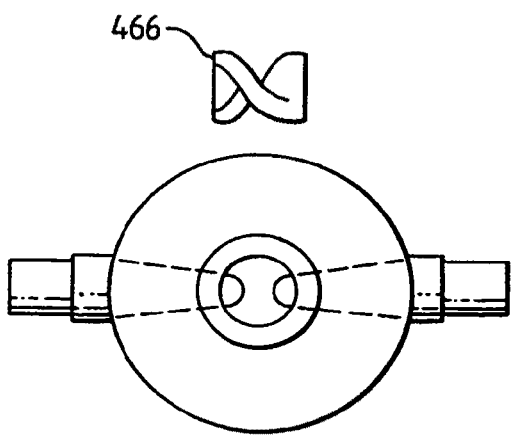
FIG. 21 is a bottom view of the nozzle of FIG. 16 with the twisted demarcation member being removed from the nozzle.
Figure 22:
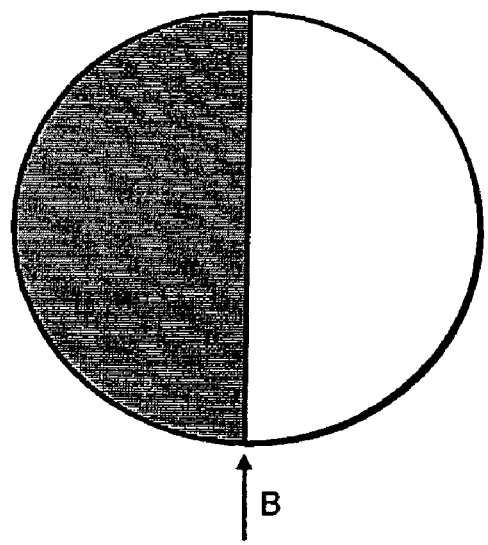
FIG. 22 is a top view of an on-demand multi-component food product in a container dispensed according to the nozzle configuration of FIGS. 19 to 21.
Figure 23:
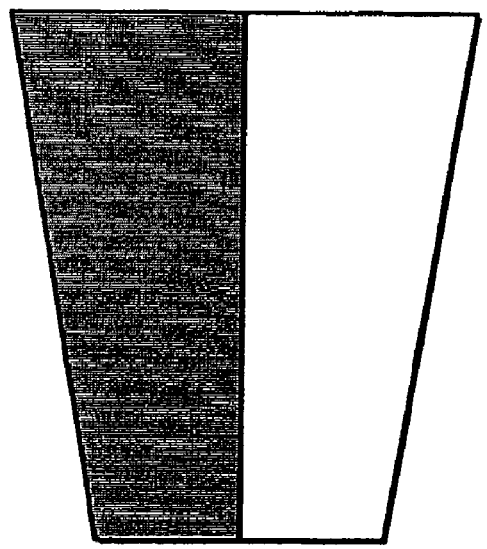
FIG. 23 is a side view of the product of FIG. 22 from direction B.

FIGS. 19 to 21 illustrate another variant of nozzle capable of creating a pattern as shown in FIGS. 22 and 23. The nozzle has two inlets 423, 424 provided on the upstream part of the nozzle that separately communicate to two separate distribution outlets 426, 427. The outlets are in fluid communication with a distribution chamber 465 in which is axially mounted a spirally shaped distribution member 466. The distribution member 466 demarcates with the internal surface 467 of the chamber two separate spiral channels 468, 469. This spiral piece is preferably removable as shown in FIG. 21 for easy cleaning of the nozzle. In use, the first component; e.g., a white plain yogurt, is discharged from one outlet 423 and the second component; e.g., a fruit based sauce, is discharged from the opposite outlet 424. The discharged components; e.g., yogurt and fruit sauce, are passed through their own separate spiral channels until discharged from the nozzle's lower end. The dispensed product, as view in FIGS. 22 and 23, from above looking downward onto the top surface of the product in the cup has the appearance of being in hemispheres. One hemisphere is occupied by the first component; e.g., plain yogurt, while the other hemisphere is occupied by a mini-layered swirled combination of the first and second component; e.g., the yogurt and fruit sauce. The dispensed product as viewed from the side of the cup appears as two broad vertical sections of respectively the first component; e.g., plain yogurt, and mini-layered swirled combination of first and second components; e.g., yogurt and fruit sauce. The design as illustrated is obtained by co-dispensing the components.

In another possible alternative (not shown), the nozzle may be replaced by a cluster of tubes maintained assembled together by a frame. This frame would hold the tubes and by the frame geometry, the tubes would flex in such a manner to direct their discharge flow in specific directions to achieve unique appearances.

EXAMPLES

Example 1

Recipe for Co-Dispensed Fruit and Yogurt "Mini-Layered" Product

The product as shown in FIG. 9 was automatically dispensed by the dispensing device of the invention. A typical spoonable plain yogurt component packaged in 10-liter flexible package with an attached hose and a strawberry fruit sauce package in the same type of package (but 5-liter capacity) were stored in the refrigerated cabinet of the device. The components' storage capacity may be determined depending upon relative percentage usage level. The yogurt product can be any commercially available yogurt of the typical texture and consistency as found in refrigerated cup yogurts. The yogurt had a specific gravity of about 1.0 gram/cm$^3$ and a viscosity of about 40,000 centipoise (Brookfield viscometer, penetration method, 5 RPM, using spindle number 93, between 3-5° C.). The strawberry fruit jam or preserve type with a specific gravity of about 1.25 gram/cm$^3$ and Boswick flow properties of about 6.5 Boswick-scale units at refrigerated temperature and contains fruit pieces of mean size of less than or equal to about 6 mm. Each product tube is threaded through a peristaltic pumphead and the end of the tubes are cut and pushed onto one of the four tubes receiving nipples on the dispensing nozzle of FIGS. 6-8. When a button actuating the specific product recipe is pushed on the front panel of the device, the device automatically begins pumping the strawberry fruit sauce and the yogurt simultaneously through the dispensing nozzle and into a transparent serving container.

The swirled appearance is achieved by setting the pumping rate of the yogurt to 20 grams/sec and the pumping rate of the strawberry sauce to 5 grams/sec. The overall dispensing time takes place during 7 seconds. As a result, the product contains about 80% by weight of yogurt and about 20% by weight of strawberry sauce mixed in a swirled arrangement.

Example 2

Recipe for "Parfait" Layered Product

The product was dispensed according to the same ingredients as for example 1 and in the same dispensing device.

When a button actuating the specific product recipe is pushed, the machine automatically sequences:
a) Pumping yogurt from yogurt bag for a period of 1 second followed by a 0.5 seconds pause;
b) Pumping fruit sauce for a period of 3.5 seconds followed by a 1 second pause;
c) Re-do sequence a) identically;
d) Pumping fruit sauce for a period of 4.5 seconds followed by a 1 second pause;
e) Pumping yogurt for a period of 2.5 seconds and stop.

The automation is provided by the PLC unit having appropriate circuits to receive the input/output data and that comprises a stored ladder program for the above cycle usually via a software that is stored in a memory area of the PLC unit. The programming of the ladder program adapted to the above cycle is deemed to be within the normal skills of a specialist in PLC programming and, therefore, does not need to be further disclosed.

In order to achieve the appearance shown in FIG. 10, the pumping rate of the yogurt is approximately 20 grams/sec. and the pumping rate of the strawberry fruit sauce is about 8-10 grams/sec.

The final product experiences a freshly looking appearance with sharp color of the fruit easily distinguishable from the plain yogurt. No significant bleeding of the second component in the second component is noticeable after 2, 15 and even 60 minutes.

It is to be understood that the invention is not to be limited to the exact configuration as illustrated and described herein. For example, it should be apparent that a variety of materials would be suitable for use in the composition or method of making the invention according the Detailed Description. For instance, the food components are not necessarily limited to refrigerated dessert type product but may encompass a wide range of food components such as pourable culinary components such as sauce, salsa, cream, sorbet, etc. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A nozzle for use with a dispensing device, the nozzle comprising:
   a first portion comprising
   a top surface having a plurality of holes so constructed and arranged to receive a connecting portion of a bag assembly containing a food component,
   a first channel in fluid communication with a first bag assembly and extending through the first portion,
   a second channel in fluid communication with a second bag assembly and extending through the first portion; and
   a second portion downstream of the first portion, the second portion comprising
   a first concentric zone in fluid communication with the first channel, and
   a central axial zone in fluid communication with the second channel.

2. The nozzle of claim 1, wherein the connecting portion of the bag assembly is removable from the plurality of holes.

3. The nozzle of claim 1, comprising a second concentric zone and wherein the central axial zone, first concentric zone and second concentric zone are coaxial and concentric.

4. The nozzle of claim 1, wherein the connecting portion of the bag assembly received by the plurality of holes is a hose.

5. The nozzle of claim 1, wherein the first bag contains a first food component and the second bag contains a second food component that is different than the first food component.

6. The nozzle of claim 5 further comprising a third channel in fluid communication with a third bag assembly and extending through the first portion and a third concentric zone in fluid communication with the third channel.

7. The nozzle of claim 6, wherein the third bag assembly contains a third food component that is the same as one of the first and second food components.

8. The nozzle of claim 6, wherein the third bag assembly contains a third food component that is different than the first and second food components.

* * * * *